Oct. 28, 1930.  R. F. COWELL  1,779,663
NONMETALLIC COUPLING
Filed May 11, 1929
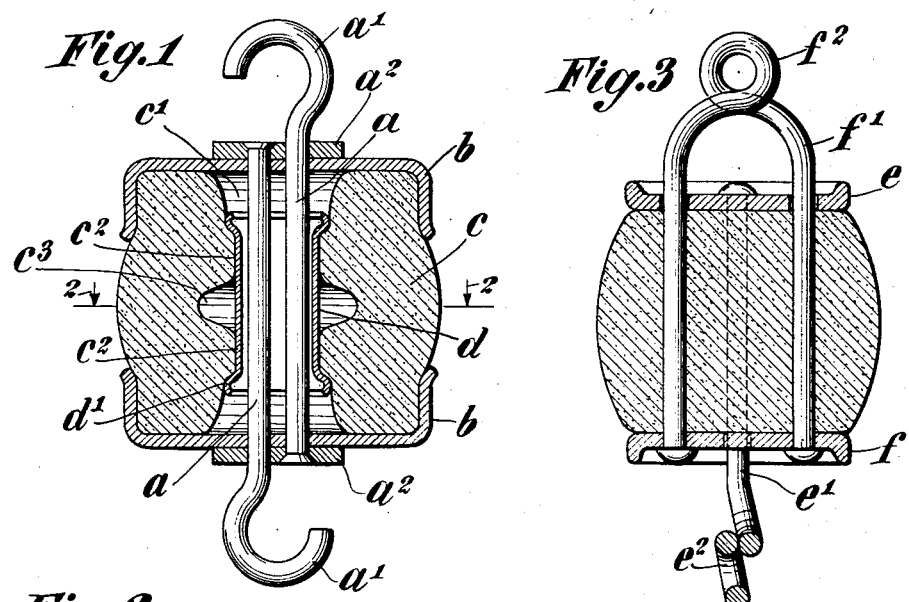
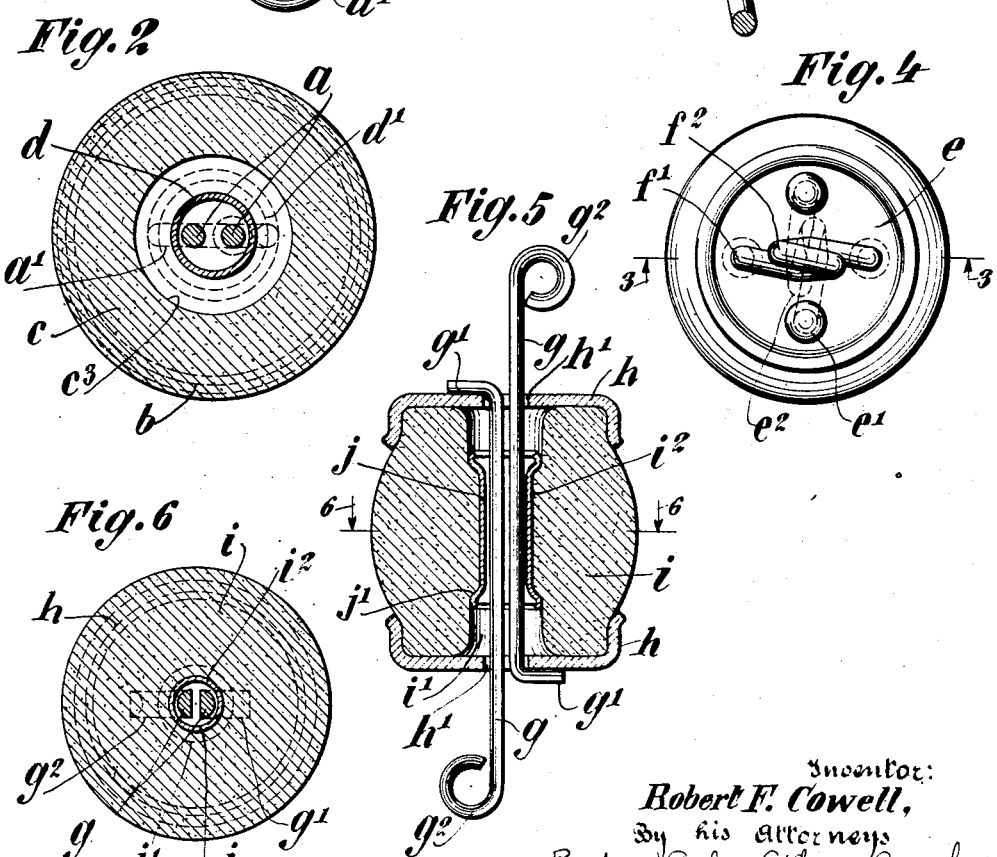
Inventor:
Robert F. Cowell,
By his attorneys
Redding, Greeley, O'Shea & Campbell Patented Oct. 28, 1930

1,779,663

UNITED STATES PATENT OFFICE

ROBERT F. COWELL, OF TEANECK, NEW JERSEY, ASSIGNOR TO INTERNATIONAL MOTOR COMPANY, OF NEW YORK, N. Y., A CORPORATION OF DELAWARE

NONMETALLIC COUPLING

Application filed May 11, 1929. Serial No. 362,326.

The present invention relates to yielding couplings between elements which are to be connected together and embodies, more specifically, an improved connection of the above character which transmits the forces between the elements through a column of yielding non-metallic material, such as rubber. Forms of connectors have been provided which utilize rubber or other similar material as a means for cushioning the forces transmitted thereby and connectors of this type now enjoy a fairly extensive use. Although the yielding non-metallic material used has been mounted between suitable bearing pads and arranged to transmit the coupling forces under compression, careful attention to the construction of the coupling with a view to preserving the life of the yielding non-metallic material, has not been given.

The present invention, accordingly, embodies an improved connector of the above character in which the yielding non-metallic material is mounted between suitable bearing pads and protected, at every point, from chafing or wearing due to contact with relatively movable parts.

In accordance with the foregoing, an object of this invention is to provide an improved connector in which coupling forces are transmitted through a block of yielding non-metallic material, such material being fully protected from rubbing and abrasion due to moving parts of the connector.

A further object of the invention is to provide a connector of the above character in which the elements are of simple construction and adapted to be assembled easily.

Further objects, not specifically enumerated above, will be apparent as the invention is described in greater detail in connection with the accompanying drawings, wherein:

Figure 1 is a view in vertical section, taken through the axis of one form of connector constructed in accordance with the present invention.

Figure 2 is a view in section taken on line 2—2 of Figure 1 and looking in the direction of the arrows.

Figure 3 is a view in section taken on line 3—3 of Figure 4, and looking in the direction of the arrows.

Figure 4 is a plan view showing a modified form of connector.

Figure 5 is a view in section, similar to Figure 1, showing a further modified form of the invention.

Figure 6 is a view in section taken on line 6—6 of Figure 5, and looking in the direction of the arrows.

Referring particularly to Figures 1 and 2 of the above drawings, pull rods $a$ are provided, these rods being formed with hooked extensions $a'$ for securing the connector to a desired object. The pull rods extend in opposite directions and the ends thereof are secured in end plates $a^2$ in which the shanks of the oppositely extending pull rods are slidably mounted. Bearing plates $b$ are carried on the pull rods under the end plates $a^2$ and a block of yielding non-metallic material $c$ is mounted, at its ends, in the bearing plates $b$. The yielding non-metallic material is formed with an axial bore $c'$ within which a tube $d$ is mounted. It is preferred that the inner periphery of the bore $c'$ be formed with restricted portions $c^2$ to engage the flared ends $d'$ of the tube $d$ to secure the latter in place. An annular recess $c^3$ may be formed in the block of yielding non-metallic material to permit the block to flow when extreme forces are exerted thereon.

It will be seen that relative movement between the pull rods $a$ and the bearing plates $b$ will be accommodated by the above construction, such movement being yieldingly resisted by the block of yielding non-metallic material $c$. During such movement, the tube $d$ will prevent the yielding non-metallic material from engaging the shanks of the pull rods and thus being chafed.

In the construction shown in Figures 3 and 4, spaced bearing plates $e$ and $f$ carry U-shaped pull rods $e'$ and $f'$, respectively. Pull rods $e'$ are slidably mounted in bearing plate $f$, while pull rods $f'$ are slidably mounted in bearing plate $e$. If desired, loops $e^2$ and $f^2$ may be formed in the pull rods to facilitate the connection thereof to the desired objects.

In the construction shown in Figures 5 and 6, pull rods $g$ are formed with turned back extremities $g'$ and loops $g^2$. The loops enable the pull rods to be secured to the desired objects and the turned back extremities $g'$ directly engage bearing plates $h$ between which a block of yielding non-metallic material $i$ is mounted. The block $i$ is formed with a central bore $i'$ having a restricted portion $i^2$. A tube $j$, formed with flaring ends $j'$ is carried within the bore and secured in position by the restricted portion $i^2$. The pull rods are slidably carried in apertures $h'$ in the bearing plate $h$, thus enabling the bearing plates to be moved with respect to each other.

In this modification of the invention, relative movement between the pull rods and the block of yielding non-metallic material $i$ takes place without any engagement of the periphery of the central bore $i'$ with the pull rods $g$. The construction of the foregoing mechanism is simple and the operation thereof effective, the life of the block of yielding non-metallic material being materially increased by the insertion of the central tube as described above.

While the invention has been described with reference to the specific constructions shown in the accompanying drawings, it is not to be limited, save as defined in the appended claims.

I claim as my invention:

1. A connection of the character described comprising opposed bearing plates, a block of yielding non-metallic material interposed between the plates, a central bore in the block formed with a restricted portion, oppositely extending pull rods secured at one end in the respective plates and extending through the other respective plates, and a tube having portions engaging the restricted portion through which the rods pass and lying between the rods and the yielding non-metallic material.

2. A connection of the character described comprising opposed bearing plates, a block of yielding non-metallic material interposed between the plates, a central bore in the block, oppositely extending pull rods secured at one end in the respective plates and extending through the other respective plates, and a tube secured in the bore through which the rods pass and lying between the rods and the yielding non-metallic material.

This specification signed this 8th day of May A. D. 1929.

ROBERT F. COWELL.